(12) United States Patent
Wang

(10) Patent No.: US 9,052,747 B2
(45) Date of Patent: Jun. 9, 2015

(54) HALF KEYBOARD

(75) Inventor: Yi-Shen Wang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 2233 days.

(21) Appl. No.: 11/430,962

(22) Filed: May 10, 2006

(65) Prior Publication Data

US 2006/0279434 A1    Dec. 14, 2006

(30) Foreign Application Priority Data

Jun. 13, 2005  (TW) ................ 94119525 A

(51) Int. Cl.
*G06F 3/02*     (2006.01)
*G06F 1/16*     (2006.01)

(52) U.S. Cl.
CPC ............ *G06F 3/0216* (2013.01); *G06F 3/0219* (2013.01); *G06F 1/1626* (2013.01); *G06F 1/1664* (2013.01)

(58) Field of Classification Search
CPC .... G06F 3/0219; G06F 3/0221; G06F 3/0233
USPC ................................................. 345/168–179
See application file for complete search history.

(56) References Cited

U.S. PATENT DOCUMENTS

| | | | |
|---|---|---|---|
| 6,157,323 A | 12/2000 | Tso et al. | |
| 6,847,706 B2 * | 1/2005 | Bozorgui-Nesbat | 379/93.27 |
| 6,867,965 B2 * | 3/2005 | Khoo | 361/679.3 |
| 2003/0179178 A1* | 9/2003 | Zargham | 345/156 |
| 2003/0193478 A1* | 10/2003 | Ng et al. | 345/168 |
| 2004/0069600 A1* | 4/2004 | Xie | 200/5 R |
| 2004/0104896 A1* | 6/2004 | Suraqui | 345/168 |
| 2004/0119685 A1* | 6/2004 | Harries et al. | 345/156 |
| 2004/0119697 A1* | 6/2004 | Kamizono | 345/168 |
| 2004/0178995 A1* | 9/2004 | Sterling | 345/173 |
| 2004/0189594 A1* | 9/2004 | Sterling | 345/156 |
| 2004/0243747 A1* | 12/2004 | Rekimoto | 710/72 |
| 2005/0024338 A1* | 2/2005 | Ye | 345/168 |
| 2005/0122313 A1* | 6/2005 | Ashby | 345/168 |
| 2005/0190160 A1* | 9/2005 | Wang et al. | 345/168 |
| 2005/0281604 A1* | 12/2005 | Choe et al. | 400/486 |
| 2006/0132447 A1* | 6/2006 | Conrad | 345/168 |
| 2006/0190836 A1* | 8/2006 | Ling Su et al. | 715/773 |
| 2006/0244727 A1* | 11/2006 | Salman et al. | 345/168 |
| 2008/0138135 A1* | 6/2008 | Gutowitz | 400/486 |
| 2008/0252603 A1* | 10/2008 | Dietz et al. | 345/169 |

FOREIGN PATENT DOCUMENTS

| | | |
|---|---|---|
| EP | 1 515 527 A1 | 3/2005 |
| JP | 2000-66815 | 3/2000 |
| TW | 502199 | 9/2002 |

* cited by examiner

*Primary Examiner* — Alexander Eisen
*Assistant Examiner* — Nelson Lam
(74) *Attorney, Agent, or Firm* — Rabin & Berdo, P.C.

(57) ABSTRACT

A half keyboard having a key input system with a set of keys, wherein the set of keys is arranged as a conventional keyboard, such as a Qwerty keyboard, approximately folded in half so that the key of the set of keys indicates more multiple characters, symbols and/or functions.

22 Claims, 3 Drawing Sheets

HALF KEYBOARD

RELATED APPLICATIONS

The present application is based on, and claims priority from, Taiwan Application Serial Number 94119525, filed Jun. 13, 2005, the disclosure of which is hereby incorporated by reference herein in its entirety.

BACKGROUND

1. Field of Invention

The present invention relates to a key input system. More particularly, the present invention relates to a key input system of a miniaturized keyboard arrangement adapted to a usage of a conventional Qwerty keyboard.

2. Description of Related Art

FIG. 1 shows a standard input system of a conventional Qwerty keyboard. The Qwerty keyboard is the most well known and used by numerous users. The name "Qwerty" originates from the characteristic of the keyboard arrangement that firstly arranges six English letters in the order "Q, W, E, R, T, Y" from left to right.

When inputting English letters by the Qwerty keyboard, a user is used to commanding English letters "Q, W, E, R, T, A, S, D, F, G, Z, X, C, V, B" of the left side (102) in the keyboard by the left hand and commanding English letters "Y, U, I, O, P, H, J, K, L, N, M" of the right side (104) in the keyboard by the right hand. Because of frequent practice, skilled users can input the desired characters without looking at the keyboard. They are fluent in the arrangement of the Qwerty keyboard and command specific keys by specific fingers.

Particularly, the methods to improve input skill, such as expediting the input speed and accuracy, taught by some refresher courses and books are aimed at the Qwerty keyboard.

Moreover, input methods and software of many languages are also based on the arrangement of English letters on the Qwerty keyboard. For example, "Boshiamy Input Method Software" for inputting Chinese words directly adopts English letters shown on the Qwerty keyboard as notations to type without marking specified notations on the keyboard.

However, the sizes of many modern electronic devices, especially mobile ones, such as the cellular phone and PDA, are continually being miniaturized and so too are the areas to allocate keyboards. Therefore, factories provide many input systems of miniaturized keyboards. However, people have been accustomed to and rely on the Qwerty keyboard. When the miniaturized keyboards with the arrangements different from the Qwerty keyboard are presented, extreme difficulty arises because people have to find the position of each key and rehash their input customs.

For the foregoing reasons, there is a need for providing a key input system of an arrangement consistent with customs of traditional Qwerty keyboards in miniaturized keyboards to solve the above-mentioned inconvenience.

SUMMARY

The present invention is directed to a key input system with a set of keys, wherein the set of keys are approximately arranged by folding an arrangement of a conventional keyboard, such as a Qwerty keyboard, to make the key represent more characters, symbols and/or functions.

The advantage of the present invention is that people can command different keys by their left hands and their right hands respectively, as they are used to do. The arrangement of the present invention can reduce the number of buttons in a keyboard and is adapted to input customs of conventional keyboards.

It is to be understood that both the foregoing general description and the following detailed description are by examples and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
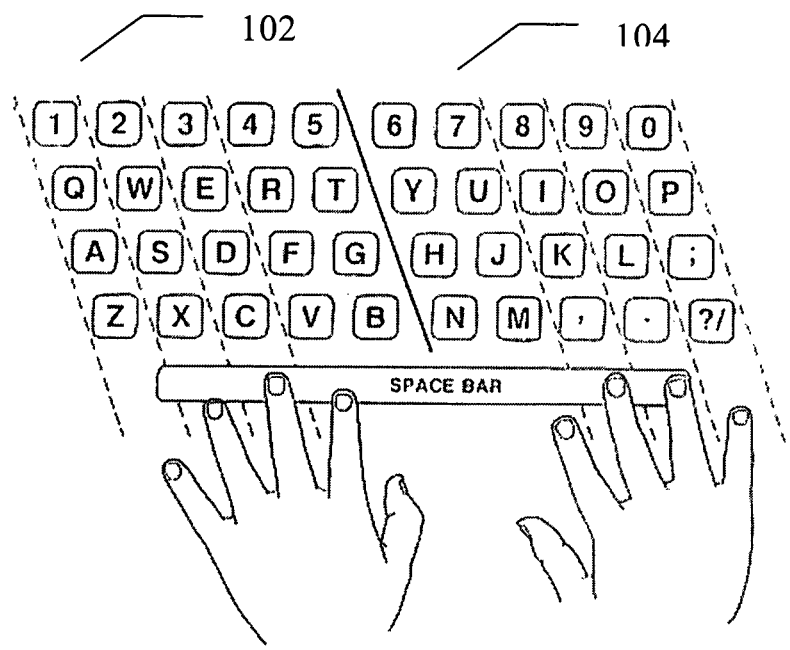
FIG. 1 shows a standard input system of a conventional Qwerty keyboard.

Reference will now be made in detail to the present preferred embodiments of the invention, examples of which are illustrated in the accompanying drawings. Wherever possible, the same reference numbers are used in the drawings and the description to refer to the same or like parts.

Figure 2:
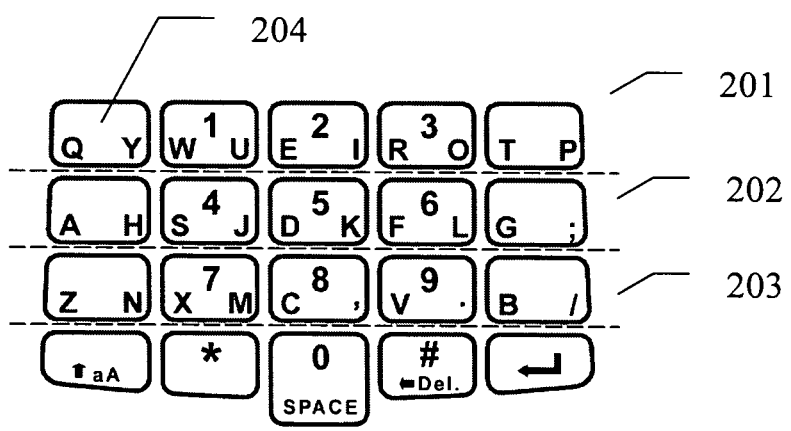
FIG. 2 shows a keyboard according to a preferred embodiment of the present invention.

FIG. 2 shows a keyboard according to a preferred embodiment of the present invention. The set of keys are approximately arranged by folding an arrangement of a conventional keyboard, such as a Qwerty keyboard to make the key represent more characters, symbols and/or functions, wherein the arrangement of the conventional keyboard are at least selected from the group consisting of English letters, phonetic notations, or the notations of various Chinese input methods, such as the Changjei input method and the Dayi input method.

For example, the set of keys in the arrangement of English letters comprise:

a first row of keys (201) including a first key indicative of Q and Y, a second key of W and U, a third key of E and I, a fourth key of R and O, and a fifth key of T and P;

a second row of keys (202) including a first key indicative of A and H, a second key of S and J, a third key of D and K, a fourth key of F and L, and a fifth key of G;

and a third row of keys (203) including a first key indicative of Z and N, a second key of X and M, a third key of C, a fourth key of V, and a fifth key of B.

Figure 3:
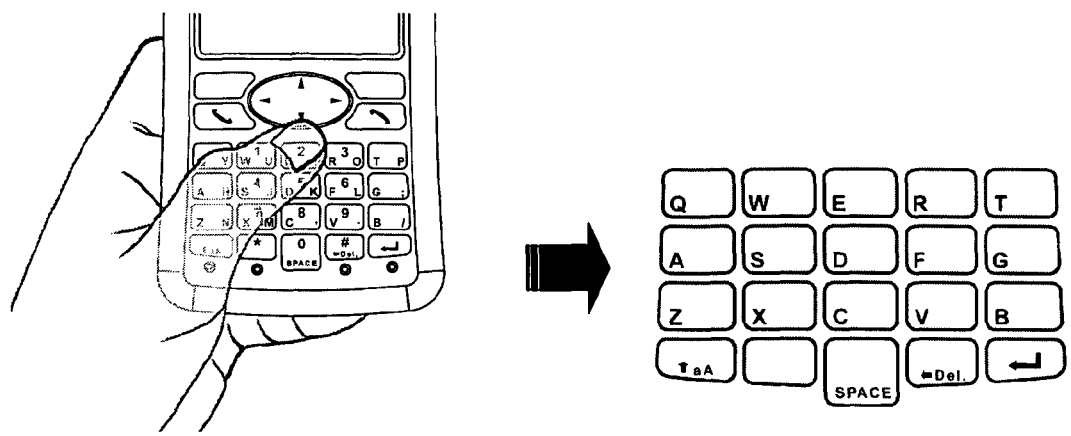
FIG. 3 illustrates an input usage of the left hand according to another preferred embodiment of the present invention.

The above-mentioned arrangement advantageously reduces the number of buttons in a keyboard and is adapted to input customs of conventional keyboards. The input usages of the left hand and the right hand according to the present invention are illustrated respectively herein. FIG. 3 illustrates an input usage of the left hand according to another preferred embodiment of FIG. 2, wherein the arrangement of the keys is the same as the left portion of the Qwerty keyboard; and FIG. 4 illustrates an input usage of the right hand according to another preferred embodiment of FIG. 2, wherein the arrangement of the keys is the same as the right portion of the Qwerty keyboard.

Figure 4:
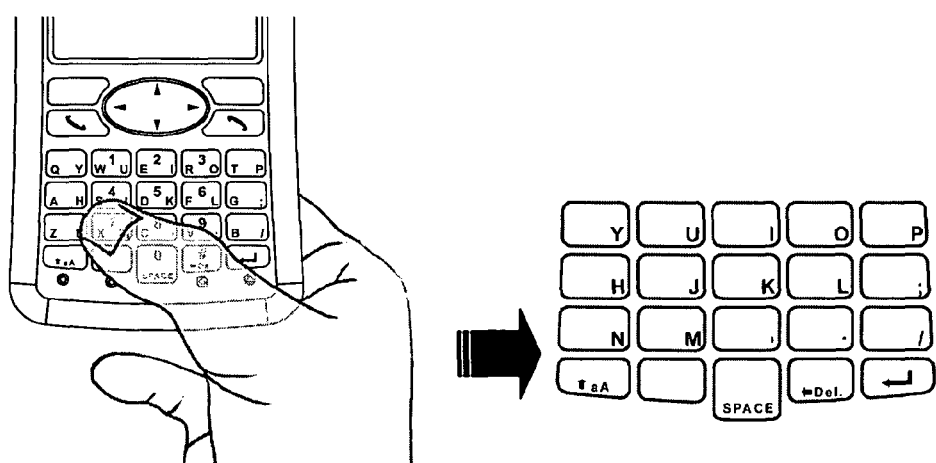
FIG. 4 illustrates an input usage of the right hand according to another preferred embodiment of the present invention.
Figure 5:
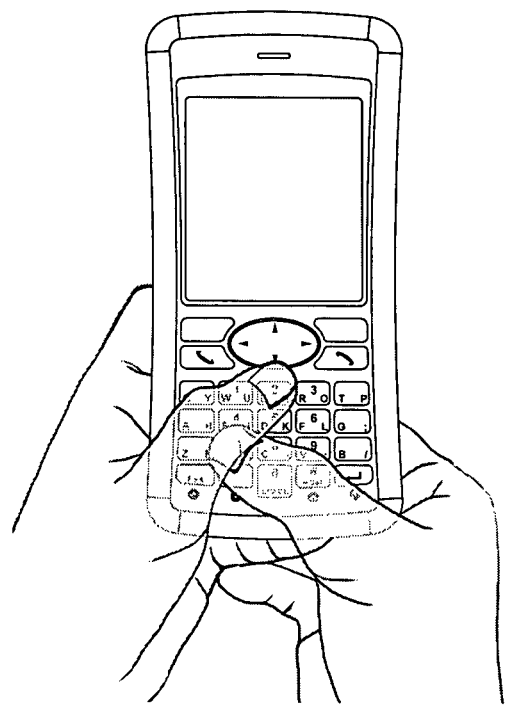
FIG. 5 illustrates an input usage of both left hand and right hand according to another preferred embodiment of the present invention.

The arrangement of the set of keys in FIG. 2 can be achieved by folding arrangements of the sets of keys in FIG. 3 and FIG. 4 in half. The input usage of the arrangement of the set of keys in FIG. 2 is shown in FIG. 5, wherein a user can use both hands in turns on a miniaturized keyboard without changing the custom to input by both hands.

In another preferred embodiment, besides the above-mentioned English letters, phonetic notations, and notations of the Changjei input method and the Dayi input method, the key of the set of keys can further indicate characters, symbols, or functions respectively, and the set of keys can comprise additional keys that indicate characters, symbols, or functions respectively, such as:

1, 2, 3, 4, 5, 6, 7, 8, 9, 0, ', ~, !, @, #, $, %, ^, &, *, (,), _, -, +, =, |, \, {, }, [, ], :, ;, ", ', <, ";", >, ., ?, /; and Menu, Esc, Tab, Caps Lock, Shift, Ctrl, Alt, Insert, Delete, Home, End, Page Up, Page Down, Print Screen, Scroll Lock, Pause Break, Number Lock, Space Bar.

In another preferred embodiment, when a key of the above-mentioned set of keys indicative of multiple characters, symbols or functions is pressed, an input can be decided as one of the multiple characters, symbols or functions depending on what side of the key is pressed. In another preferred embodiment, the input can also be decided by combining a functional "Shift" key.

Moreover, when a key of the above-mentioned set of keys indicative of multiple characters, symbols or functions is pressed, an input can be decided by recognizing how many times the key is pressed. For example, if a user presses a key indicative of both "Q" and "Y" once, "Q" is inputted; and if twice, "Y" is inputted.

In yet another preferred embodiment, when a key of the above-mentioned set of keys indicative of a character and a numeral is pressed, whether an input is decided as the character or the numeral can be based on an input condition. For example, if the input condition is the numeral field of a contact list and a user presses a key indicative of a character and a numeral, a numeral is inputted.

The set of keys of the present invention is suitable for physical keyboards, virtual keyboards displayed in monitors or virtual keyboards projected by optical devices, wherein the set of keys can comprise keys, push buttons, switch buttons, cam switches, rotary switches and scroll wheels.

Moreover, a user can use a smart input software, such as T9 text input software, to input by the set of keys of the present invention. The smart input software can predict the word that the user wants to input according to vocabularies stored in an input system when the user presses a series of the above-mentioned keys indicative of multiple characters, symbols or functions.

Figure 6:
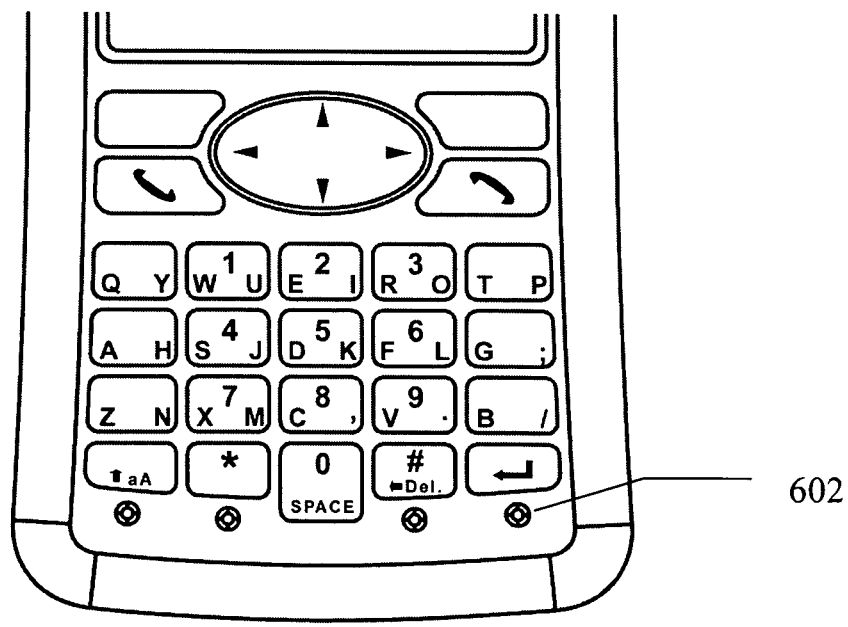
FIG. 6 shows a keyboard with motion detectors according to a further preferred embodiment of the present invention.

FIG. 6 shows a keyboard with motion detectors according to a further preferred embodiment of the present invention. The motion detectors 602 detect motions of hands of a user to determine whether the active hand is the left or right hand of the user, and it can assist the input system in determining characters, symbols or functions that the user wants to input. For example, regarding a key indicative of both "Q" and "Y" (204) shown in FIG. 2, if the hand used to press the key is the left hand, the input system will determine the character that the user wants to input is "Q". Otherwise, if the hand used to press the key is the right hand, the input system will determine the character that the user wants to input is "Y".

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A key input system comprising:
   a set of keys approximately arranged by folding an arrangement of a Qwerty keyboard, the set of keys including a right-handed input arrangement and a left-handed input arrangement respectively responding to a right portion and a left portion of the Qwerty keyboard, such that each of the keys corresponds to at least two characters including a first character in the left portion of the Qwerty keyboard and a second character in the right portion of the Qwerty keyboard;
   a first means, disposed on a left side of a bottom of the set of keys, for detecting a first motion corresponding to the left-handed input arrangement;
   a second means, disposed on a right side of the bottom of the set of keys, for detecting a second motion corresponding to the right-handed input arrangement; and
   an activation mechanism configured
      to activate the set of keys in the left-handed input arrangement, corresponding to the left portion of the Qwerty keyboard, in response to the detection of the first motion,
      to activate the set of keys in the right-handed input arrangement, corresponding to the right portion of the Qwerty keyboard, in response to the detection of the second motion, and
      to selectively activate, for each pressed key, the first character or the second character in response respectively to the detection of the first motion or the second motion,
   wherein the key input system is free of independent numeral keys.

2. The key input system of claim 1, wherein the arrangement of the conventional keyboard is at least selected from the group consisting of English letters, phonetic notations, and the notations of various Chinese input methods.

3. The key input system of claim 1, wherein the set of keys comprises additional keys indicative of characters, symbols, or functions of:

1, 2, 3, 4, 5, 6, 7, 8, 9, 0, ', ~, !, @, #, $, %, ^, &, *, (,), _, -, +, =, |, \, {, }, [, ], :, ;, ", ', <, ";", >, ., ?, /; and Menu, Esc, Tab, Caps Lock, Shift, Ctrl, Alt, Insert, Delete, Home, End, Page Up, Page Down, Print Screen, Scroll Lock, Pause Break, Number Lock, Space Bar.

4. The key input system of claim 1, wherein when a key of the set of keys indicative of multiple characters, symbols or functions is pressed, the input can be decided as one of the multiple characters, symbols or functions based on what side of the key is pressed.

5. The key input system of claim 1, wherein when a key of the set of keys indicative of multiple characters, symbols or functions is pressed, the input can be decided by incorporating a shift function key.

6. The key input system of claim 1, wherein when a key of the set of keys indicative of multiple characters, symbols or functions is pressed, the input can be decided by recognizing how many times the key is pressed.

7. The key input system of claim 1, wherein when a key of the set of keys indicative of a character and a numeral is pressed, whether an input is decided as the character or the numeral is based on an input condition.

8. The key input system of claim 7, wherein if the input condition is a numeral field of a contact list and the key indicative of a character and a numeral is pressed, a numeral is inputted.

9. The key input system of claim 1, wherein the set of keys is in one form of a physical keyboard, a virtual keyboard displayed in a display or a virtual keyboard projected by an optical device.

10. The key input system of claim 1, wherein the set of keys comprises keys, push buttons, switch buttons, cam switches, rotary switches and scroll wheels.

11. The key input system of claim 1, wherein when a key of the set of the keys indicative of multiple characters, symbols or functions is pressed, the input can be decided by a smart input software.

12. The key input system of claim 1, wherein each of the keys is accessible to both the left and the right hands.

13. The key input system of claim 1, wherein each of the keys is arranged in a keyboard of a flat shape.

14. A key input system having a set of keys, comprising:
- a first row of keys sequentially including a first key indicative of Q and Y, a second key indicative of W and U, a third key indicative of E and I, a fourth key indicative of R and O, and a fifth key indicative of T and P;
- a second row of keys sequentially including a first key indicative of A and H, a second key indicative of S and J, a third key indicative of D and K, a fourth key indicative of F and L, and a fifth key indicative of G; and
- a third row of keys sequentially including a first key indicative of Z and N, a second key indicative of X and M, a third key indicative of C, a fourth key indicative of V, and a fifth key indicative of B; and
- a first means, disposed on a left side of a bottom of the set of keys, for detecting a first motion;
- a second means, disposed on a right side of the bottom of the set of keys, for detecting a second motion; and
- a determining mechanism configured to determine which character to input when one key in the first, second and third rows of keys indicative of two characters is pressed, in response to the detection of the first motion or the second motion, and to selectively activate one of the two characters,
- wherein the key input system is free of independent numeral keys.

15. The key input system of claim 14, wherein the set of keys comprises additional keys indicative of characters, symbols, or functions of:
1, 2, 3, 4, 5, 6, 7, 8, 9, 0, ', ~, !, @, #, $, %, ^, &, *, (,), _, -, +, =, |, \, {, }, [, ], :, ;, ", ', <, ";", >, ., ?, /; and
Menu, Esc, Tab, Caps Lock, Shift, Ctrl, Alt, Insert, Delete, Home, End, Page Up, Page Down, Print Screen, Scroll Lock, Pause Break, Number Lock, Space Bar.

16. The key input system of claim 14, wherein when a key of the first, second and third rows of keys indicative of two characters is pressed, the input can be decided as one of the two characters based on what side of the key is pressed.

17. The key input system of claim 14, wherein when a key of the first, second and third rows of keys indicative of two characters is pressed, the input can be decided by incorporating a shift function key.

18. The key input system of claim 14, wherein when a key of the first, second and third rows of keys indicative of two characters is pressed, the input can be decided by recognizing how many times the key is pressed.

19. The key input system of claim 14, wherein the first, second and third rows of keys is in one form of a physical keyboard, a virtual keyboard displayed in a display or a virtual keyboard projected by an optical device.

20. The key input system of claim 14, wherein the first, second and third rows of keys comprises keys, push buttons, switch buttons, cam switches, rotary switches and scroll wheels.

21. The key input system of claim 14, wherein when a key of the first, second and third rows of keys indicative of two characters is pressed, the input can be decided by a smart input software.

22. A key input system, comprising:
- a set of keys corresponding to a first half of a full Qwerty keyboard when in a left-hand mode, and corresponding to a second half of the full Qwerty keyboard when in a right-hand mode, each of the keys corresponding to at least two characters including a first character in the first half of the full Qwerty keyboard and a second character in the second half of the full Qwerty keyboard; and
- a first means, disposed on a left side of a bottom of the set of keys, for detecting a first motion corresponding to the left-hand mode;
- a second means, disposed on a right side of the bottom of the set of keys, for detecting a second motion corresponding to the right-hand mode; and
- an activation mechanism configured to selectively activate, for each pressed key, the first character or the second character in response respectively to the detection of the first motion or the second motion, to input the corresponding first character in response to the detection of the first motion, and to input the corresponding second character in response to the detection of the second motion,
- wherein the key input system is free of independent numeral keys.

* * * * *